C. T. MOORE.
Dumping Wagon.
No. 93,828.
2 Sheets—Sheet 1.
Patented Aug. 17, 1869.
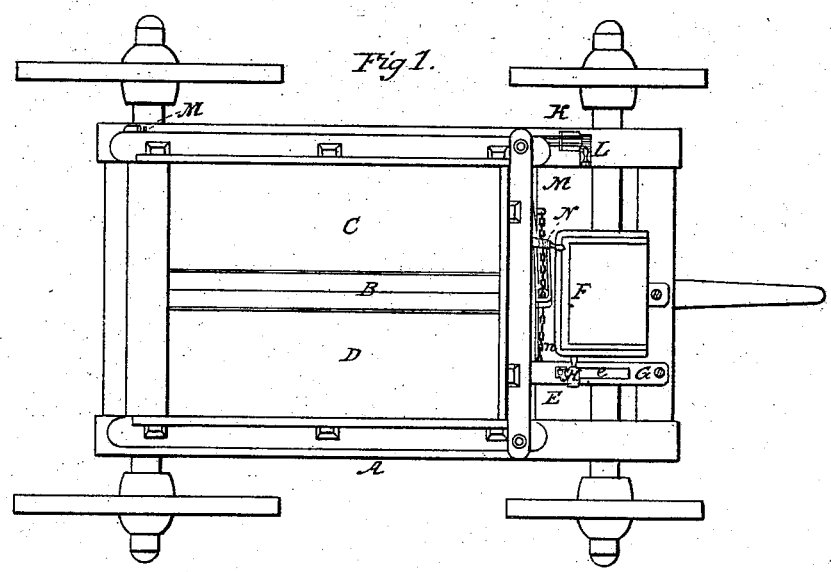
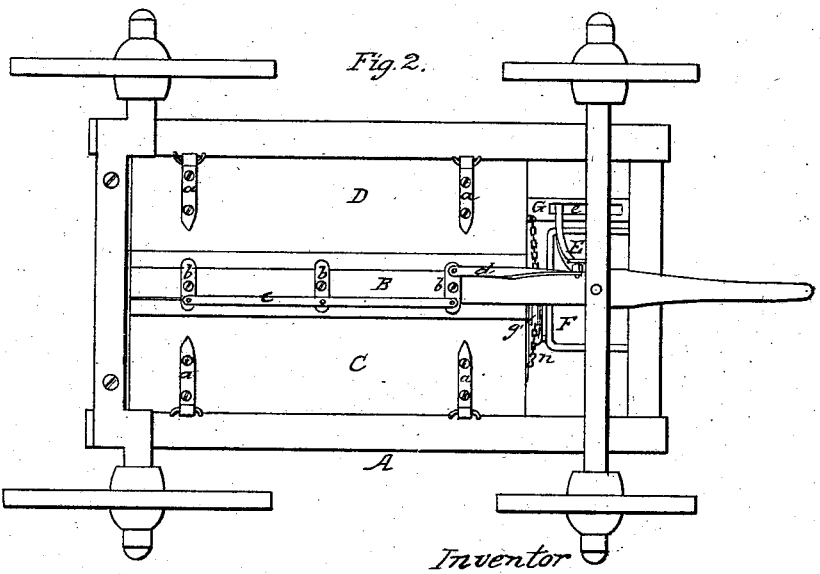
Witnesses.
S. N. Piper
J. R. Snow
Inventor
Cyrus T. Moore
by his Attorney
R. H. Eddy C. T. MOORE.
Dumping Wagon.
No. 93,828.
2 Sheets—Sheet 2.
Patented Aug. 17, 1869.
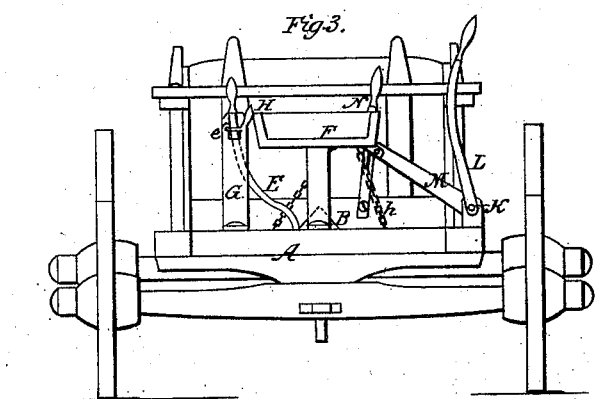
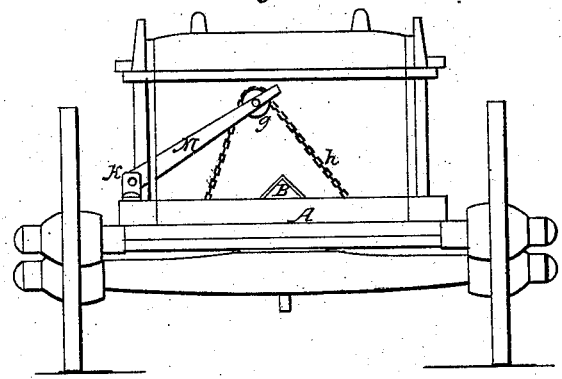
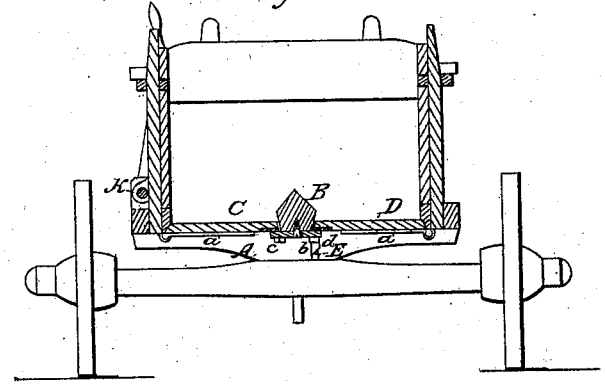
Witnesses.
S. N. Piper.
J. R. Snow
Inventor
Cyrus. T. Moore.
by his Attorney,
R. H. Eddy.

United States Patent Office.

CYRUS T. MOORE, OF GILMANTON, NEW HAMPSHIRE.

Letters Patent No. 93,828, dated August 17, 1869.

IMPROVED DUMPING-WAGON.

The Schedule referred to in these Letters Patent and making part of the same.

*To all persons to whom these presents may come:*

Be it known that I, CYRUS T. MOORE, of Gilmanton, of the county of Belknap, and State of New Hampshire, have made a new and useful invention, having reference to Dumping-Wagons; and do hereby declare the same to be fully described in the following specification, and represented in the accompanying drawings, of which—

Figure 1 is a top view,
Figure 2, a bottom view,
Figure 3, a front-end elevation,
Figure 4, a rear-end elevation, and
Figure 5, a transverse section of a dumping-wagon provided with my said invention.

The wagon-body, represented at A, is open at bottom, except in having a bar, B, extended across its middle lengthwise, and all beyond its ends, the said bar being bevelled in opposite directions on its upper face. To the said open bottom, two doors, C D, are hinged, so as to enable such doors to be dropped from a horizontal position into a vertical one, in order to discharge from the wagon-body a load of earth or other matter. These doors, hinged at their outer edges to the wagon-body, (the hinges being shown at *a a a a,*) are, when in a horizontal position, sustained therein by means of a series of turn-buttons or short levers, *b b b,* pivoted to the wider side of the cross-bar B.

The several levers or turn-buttons are connected at or near one end of each by a bar, C, which is pivoted to them.

A connecting-rod, *d,* also pivoted to the opposite end of the first turn-button, is also pivoted to the lower arm of a hand-lever, E, whose fulcrum projects from the bar B. This lever is arranged aside of the driver's seat F, and its upper arm is extended through the slot *e* of a stationary guide-bar, G, arranged and formed in manner as represented.

A bent lever, H, hinged to the bar G, and disposed near the inner end of its slot, serves, when turned down upon the bar, to hold the hand-lever in place against the rear end of the slot, and thereby hold the several turn-buttons in their positions for supporting the doors of the wagon-body.

A peculiar mechanism for raising the doors into horizontal positions, and temporarily retaining them therein, preparatory to the turn-buttons being turned around or moved, so as to pass underneath the doors, is applied to the wagon-body. This mechanism may be thus described:

From the front end of a long shaft, K, arranged alongside of the body, and duly supported in bearings, a hand-lever, L, is projected toward the seat, in manner as represented. Besides this hand-lever, there are two arms, M M, extended from the shaft, one of such arms being at the front and the other at the rear of the wagon-body. Each of these arms, near its inner end, supports one of two grooved wheels, *g g.* Chains *h h,* extending on the peripheries of these wheels, and down therefrom, have their extremities fastened to the two doors.

A lever-latch, N, fixed to the wagon-body, and arranged, with respect to the seat and the front arm M, in manner as represented, serves to catch the said arm when it is raised to its highest position, and to there retain it.

From the above, it will be seen that the discharging of the load, and the subsequent raising of the doors of the wagon-body into horizontal positions, may be effected by the driver while sitting upon the seat F.

In case of the arrival of the vehicle over a spot upon which it may be desirable to discharge the load, the driver should first move the lever for operating the turn-buttons, the movement being so as to move them from underneath the doors. Next, he has only to push back the spring-latch N. The weight of the load and that of the doors will next depress or open the doors, and cause the discharge of the load from the wagon-body. By means of the hand-lever L, the driver, by pushing such lever from him, can raise up the doors until the latch-lever may catch the front arm M, after which the locking of the doors may be effected by the driver through the means of the turn-buttons and their operative mechanism, as explained.

The middle bar B, of the bottom part of the body of the wagon, extends beyond the said body at its opposite ends, so as to constitute a stop for the arms M M to fall upon.

I claim the arrangement and combination of the chains *h h,* the grooved wheels *g g,* the arms M M, the shaft K, and the hand-lever L, applied to the wagon-body A, and its doors C D.

I also claim the arrangement and combination of the middle bar B with the wagon-body A, its doors C D, and the mechanism, as described, for raising the said doors.

I also claim the combination of the latching and locking-mechanism, as specified, with the wagon-body, its doors, and the mechanism, as explained, for raising the said doors.

CYRUS T. MOORE.

Witnesses:
R. H. EDDY,
J. R. SNOW.